(12) United States Patent
Rezaiifar et al.

(10) Patent No.: US 8,611,303 B2
(45) Date of Patent: Dec. 17, 2013

(54) SEAMLESS CONTEXT SWITCHING FOR RADIO LINK PROTOCOL

(75) Inventors: Ramin Rezaiifar, San Diego, CA (US); Peter Black, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1119 days.

(21) Appl. No.: 12/012,786

(22) Filed: Feb. 4, 2008

(65) Prior Publication Data

US 2008/0186920 A1  Aug. 7, 2008

Related U.S. Application Data

(60) Provisional application No. 60/888,019, filed on Feb. 2, 2007.

(51) Int. Cl.
*H04W 4/00* (2009.01)

(52) U.S. Cl.
USPC .......................................... 370/331; 455/436

(58) Field of Classification Search
None
See application file for complete search history.

(56) References Cited

U.S. PATENT DOCUMENTS

| | | | | |
|---|---|---|---|---|
| 6,862,450 B2* | 3/2005 | Mikola et al. | ................ | 455/438 |
| 7,043,244 B1* | 5/2006 | Fauconnier | ................... | 455/442 |
| 2002/0049062 A1* | 4/2002 | Petersen | ................... | 455/453 |
| 2002/0107019 A1* | 8/2002 | Mikola et al. | ................ | 455/436 |
| 2004/0147263 A1* | 7/2004 | Schwarz et al. | .............. | 455/436 |
| 2005/0185619 A1* | 8/2005 | Niemela et al. | .............. | 370/331 |
| 2005/0195822 A1* | 9/2005 | Lim et al. | ..................... | 370/393 |
| 2006/0262732 A1* | 11/2006 | Joutsenvirta et al. | ........ | 370/254 |
| 2007/0072612 A1* | 3/2007 | Haraguchi et al. | ........... | 455/436 |
| 2007/0149226 A1* | 6/2007 | de Vries | ...................... | 455/502 |
| 2007/0293224 A1* | 12/2007 | Wang et al. | .................. | 455/436 |
| 2009/0201810 A1* | 8/2009 | Kazmi et al. | .................. | 370/232 |
| 2010/0284365 A1* | 11/2010 | Sundell et al. | ................ | 370/331 |
| 2011/0009073 A1* | 1/2011 | Burbidge et al. | .............. | 455/68 |

* cited by examiner

*Primary Examiner* — Bunjob Jaroenchonwanit

(74) *Attorney, Agent, or Firm* — Nerrie M. Zohn

(57) ABSTRACT

Techniques to support handover of a terminal from a source base station to a target base station are described. In one design, a determination is made whether a change in personality is requested by the terminal. If the answer is 'Yes', then the personality of the terminal may be switched by sending one or more appropriate messages. The connection and RLP for the terminal may be reset due to the change in personality. A buffer of data reported by the source base station as being served to the terminal (e.g., no NAK was sent) may be saved by a BSC/PCF. The buffer of data may be sent to the target base station when handover occurs. New data may thereafter be sent to the target base station. This buffer of duplicate data may avoid both loss of data and retransmission timeout by TCP during the handover.

31 Claims, 14 Drawing Sheets

US 8,611,303 B2

SEAMLESS CONTEXT SWITCHING FOR RADIO LINK PROTOCOL

I. CLAIM OF PRIORITY UNDER 35 U.S.C. §119

The present Application for patent claims priority to Provisional U.S. Application Ser. No. 60/888,019, entitled "SEEMLESS CONTEXT SWITCHING FOR RADIO LINK PROTOCOLS," filed Feb. 2, 2007, assigned to the assignee hereof, and expressly incorporated herein by reference.

BACKGROUND

I. Field

The present disclosure relates generally to communication, and more specifically to techniques for transmitting data in a wireless communication system.

II. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may implement multiple revisions of a given air interface standard. An access terminal may communicate with the system and may be handed over from one base station implementing one revision to another base station implementing another revision. It may be desirable to perform the handover in a seamless manner in order to avoid losing data and other deleterious effects.

DETAILED DESCRIPTION

The techniques described herein may be used for various wireless communication systems such as CDMA, TDMA, FDMA, OFDMA, and SC-FDMA systems. The terms "systems" and "networks" are often used interchangeably. A CDMA system may implement a radio technology such cdma2000, Universal Terrestrial Radio Access (UTRA), Evolved UTRA (E-UTRA), etc. The terms "radio technology", "air interface", and "radio access technology" are often used interchangeably. cdma2000 covers IS-2000, IS-95 and IS-856 standards. UTRA includes Wideband-CDMA (W-CDMA) and Low Chip Rate (LCR). A TDMA system may implement a radio technology such as Global System for Mobile Communications (GSM). An OFDMA system may implement a radio technology such as Long Term Evolution (LTE) (which is part of E-UTRA), IEEE 802.20, Flash-OFDM®, etc. UTRA, E-UTRA, GSM and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

For clarity, certain aspects of the techniques are described below for a High Rate Packet Data (HRPD) system that implements IS-856. HRPD is also referred to as Evolution-Data Optimized (EV-DO), Data Optimized (DO), High Data Rate (HDR), etc. The terms HRPD and EV-DO are often used interchangeably. Currently, HRPD Revisions (Revs.) 0, A, and B have been standardized, HRPD Revs. 0 and A are deployed, and HRPD Rev. C is under development. HRPD Revs. 0 and A cover single-carrier HRPD (1×HRPD). HRPD Rev. B covers multi-carrier HRPD and is backward compatible with HRPD Revs. 0 and A. The techniques described herein may be incorporated in any HRPD revision. For clarity, HRPD terminology is used in much of the description below.

Figure 1:
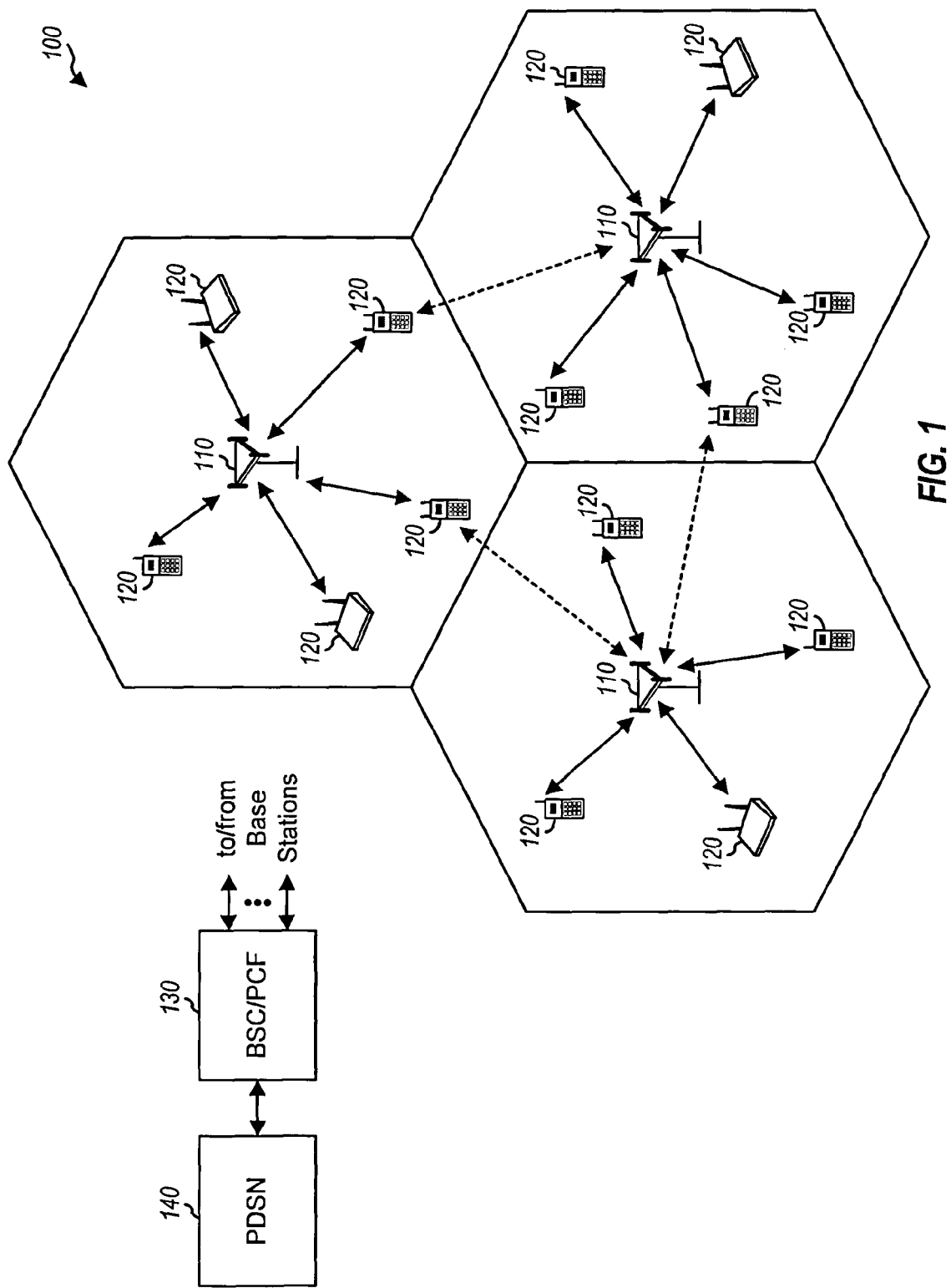
FIG. 1 shows a wireless communication system.

FIG. 1 shows an HRPD communication system 100 with multiple base stations 110 and multiple terminals 120. System 100 is also commonly referred to as an access network (AN). A base station is generally a fixed station that communicates with the terminals and may also be referred to as an access point, a Node B, etc. Each base station 110 provides communication coverage for a particular geographic area and supports communication for the terminals located within the coverage area. The term "cell" can refer to a base station and/or its coverage area. The coverage area of a base station may be partitioned into multiple smaller areas. Each smaller may be served by a respective base station subsystem (BTS). The term "sector" can referred to a BTS and/or its smallest coverage. Base stations 110 may couple to a Base Station Controller/Packet Control Function (BSC/PCF) 130 that provides coordination and control for these base stations. BSC/PCF 130 may couple to other network entities such as a Packet Data Serving Node (PDSN) 140, etc.

Terminals 120 may be dispersed throughout the system, and each terminal may be stationary or mobile. A terminal may also be referred to as an access terminal, a mobile station, a user equipment, a subscriber unit, a station, etc. A terminal may be a cellular phone, a personal digital assistant (PDA), a wireless device, a handheld device, a wireless modem, a laptop computer, etc. A terminal may support any HRPD Revision. In HRPD, a terminal may receive a transmission on the forward link from one base station at any given moment and may send a transmission on the reverse link to one or more base stations. The forward link (or downlink) refers to the communication link from the base stations to the terminals, and the reverse link (or uplink) refers to the communication link from the terminals to the base stations.

Figure 2:
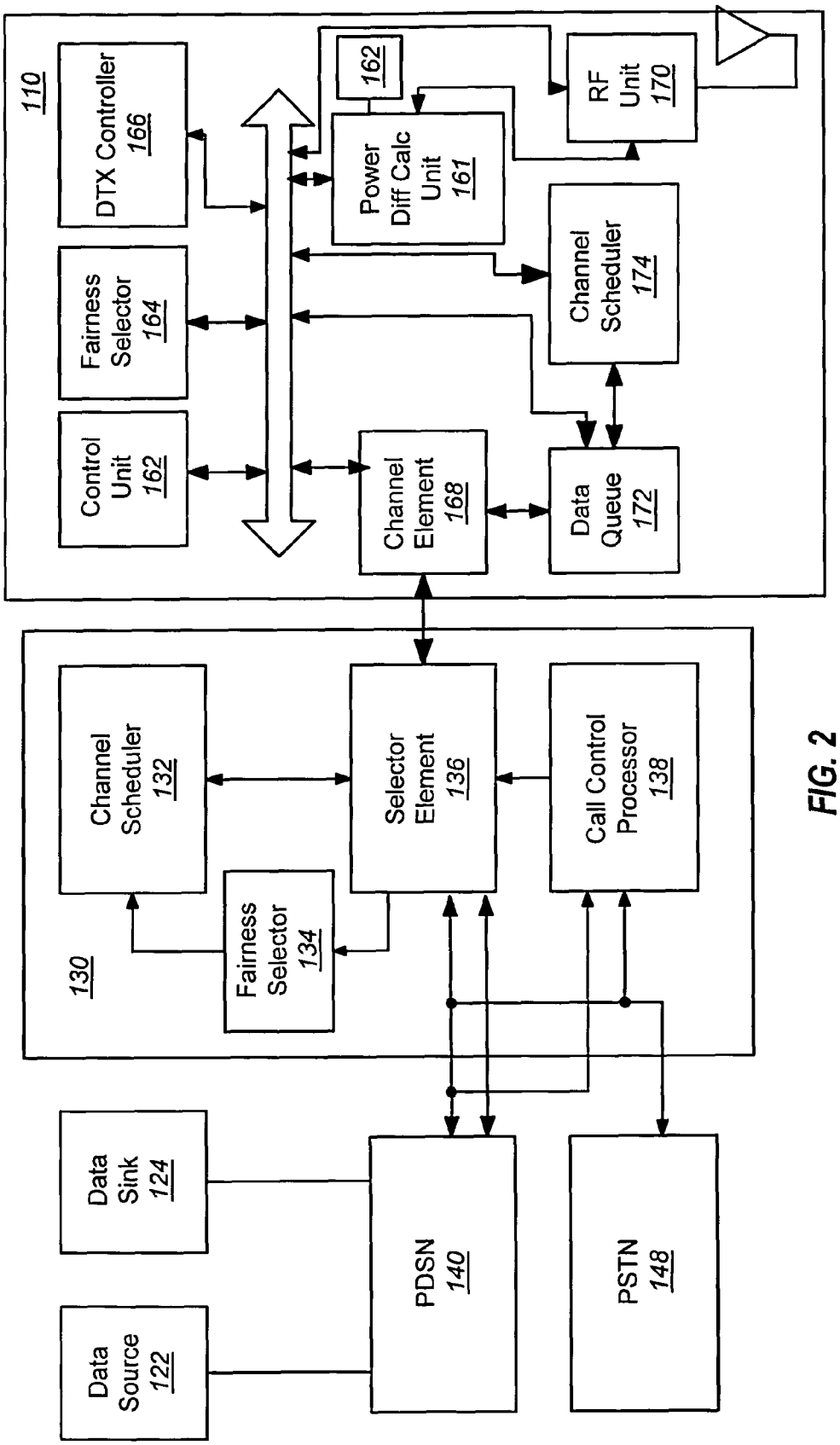
FIG. 2 shows a block diagram of a base station and a BSC/PCF in FIG. 1.

FIG. 2 shows a block diagram of a design of a base station 110 and BSC/PCF 130 in FIG. 1. BSC/PCF 130 may interface with PDSN 140, a Public Switched Telephone Network (PSTN) 148, and a set of base stations in the system (only one base station 110 is shown in FIG. 2 for simplicity). BSC/PCF 130 may coordinate the communication between the terminals in the system and other users connected to PDSN 140 and PSTN 148. PSTN 148 may interface with users through a standard telephone network (not shown in FIG. 2).

BSC/PCF 130 may include a channel scheduler 132 for implementing a scheduling algorithm for transmissions in system 100. Channel scheduler 132 may determine the length of a service interval during which data is to be transmitted to any particular terminal based on the terminal's associated instantaneous rate for receiving data. The service interval may not be contiguous in time but may occur once every n slots. In one design, the first portion of a packet may be transmitted during a first slot at a first time and the second portion may be transmitted 4 slots later at a subsequent time. Also, any subsequent portions of the packet may be transmitted in multiple slots having a similar 4 slots spread, i.e., 4 slots apart from each other. In one design, the instantaneous rate of receiving data Ri determines the service interval length Li associated with a particular data queue.

Channel scheduler 132 may select a particular data queue for transmission. The associated quantity of data to be transmitted may then be retrieved from a data queue 172 and provided to a channel element 168 for transmission to the terminal associated with data queue 172. Channel scheduler 132 may select the queue for providing the data, which may be transmitted in a following service interval using information including the weight associated with each of the queues. The weight associated with the transmitted queue may then be updated.

BSC/PCF 130 may also include many selector elements 136, although only one is shown in FIG. 2 for simplicity. Each selector element 136 may be assigned to control communication between one or more base stations and one terminal (not shown in FIG. 2). If selector element 136 has not been assigned to a given terminal, then a call control processor 138 may be informed of the need to page the terminal. Call control processor 138 may then direct one or more base stations to page the terminal.

A data source 122 may contain data to be sent to a given terminal. Data source 122 may provide the data to PDSN 140, which may route the data to selector element 136. Selector element 136 may then send the data to each base station in communication with the terminal. Each base station 160 may maintain data queue 172, which may store the data to be transmitted to the terminal.

Data queue 172 may provide data in units of packets to channel element 168. On the forward link, a "data packet" may refer a quantity of data to be transmitted to a terminal within a "time slot". A time slot may have a predetermined duration of 1.667 milliseconds (ms) or some other duration. A data packet may have a particular maximum size, which may be 1024 bits or some other number of bits.

For each data packet, channel element 168 may insert applicable control fields. Channel element 168 may then generate a cyclic redundancy check (CRC) for the data packet and control fields and may append a set of code tail bits to obtain a formatted packet comprising the data packet, control fields, CRC, and code tail bits. Channel element 168 may then encode the formatted packet and interleave (or reorder) the bits within the encoded packet. Channel element 168 may further cover the interleaved packet with one or more Walsh codes and may spread the covered data with a short inphase pseudo-random number (PNI) code and a short quadrature PN (PNQ) code. A radio frequency (RF) unit 170 may process (e.g., quadrature modulate, filter, and amplify) the spread data to generate a forward link signal, which may be transmitted via an antenna and over the air to the terminal.

Figure 3:
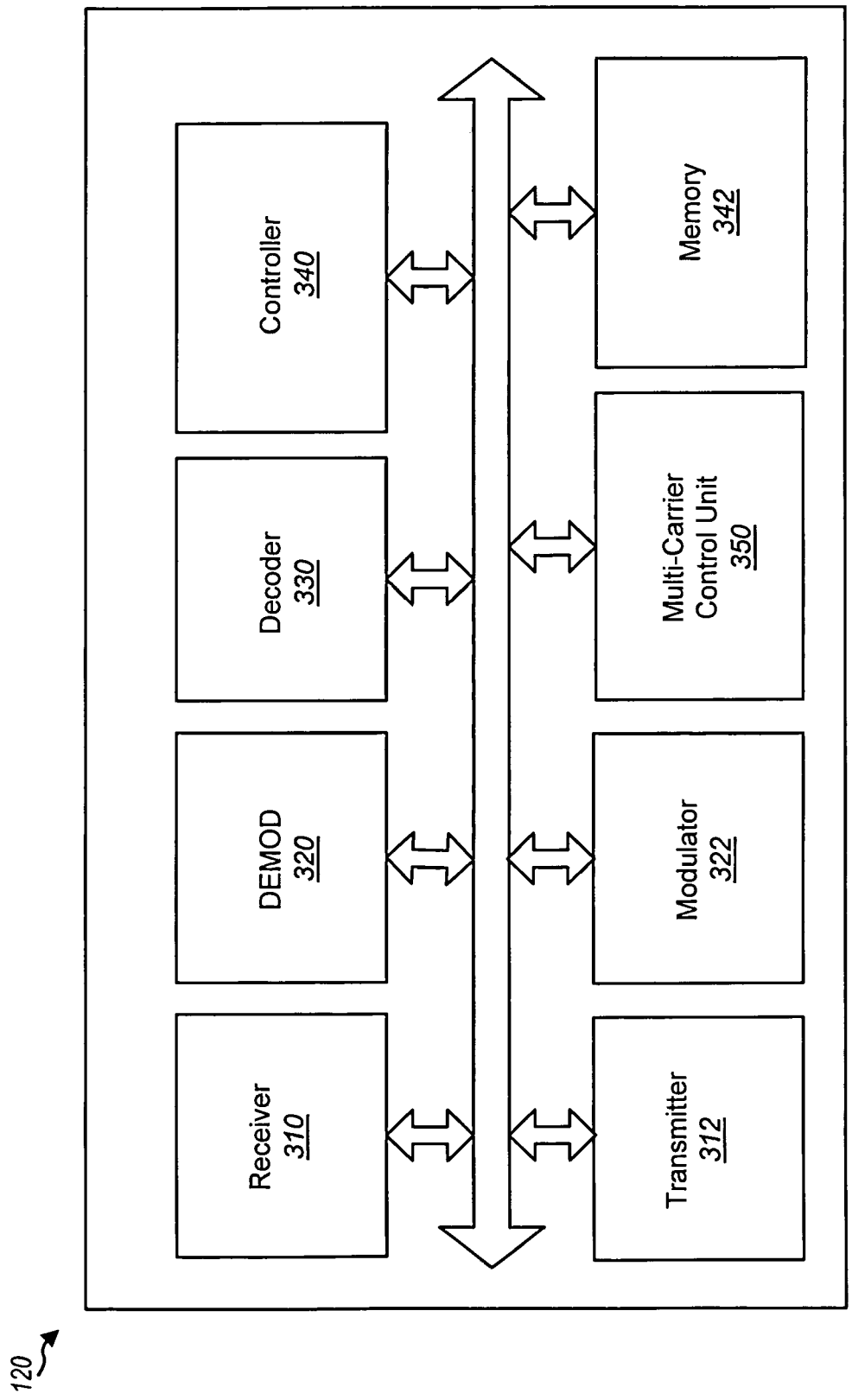
FIG. 3 a block diagram of a terminal.

FIG. 3 a block diagram of a design of a terminal 120. At terminal 120, the forward link signal from base station 110 may be received by an antenna (not shown in FIG. 3) and routed to a receiver 310. Receiver 310 may process (e.g., filter, amplify, quadrature demodulate, and digitize) the received signal to obtain samples. A demodulator (DEMOD) 320 may despread the samples with the short PNI and PNQ codes and may decover the despread samples with the Walsh cover(s) used by base station 110 to obtain decovered symbols. A decoder 330 may process (e.g., de-interleave, decode, and CRC check) the decovered symbols in a manner complementary to the processing performed at base station 110. Decoder 330 may provide decoded data to a memory 342. A controller 340 may direct the operation at terminal 120. Memory 342 may store program codes and data for terminal 120. Terminal 120 may also include other units such as a transmitter 312, a modulator 322, and a multi-carrier control unit 350.

Terminal 120 may generate data rate control (DRC) and/or other information. Transmitter 312 and modulator 322 may process the DRC and/or other information to generate a reverse link signal, which may be transmitted to base station 110. At base station 110, the reverse link signal may be received by the antenna and coupled to RF unit 170. The DRC information may be demodulated by channel element 168 and provided to channel scheduler 132 located in BSC/PCF 130 and/or a channel scheduler 174 located in base station 110.

Figure 4:
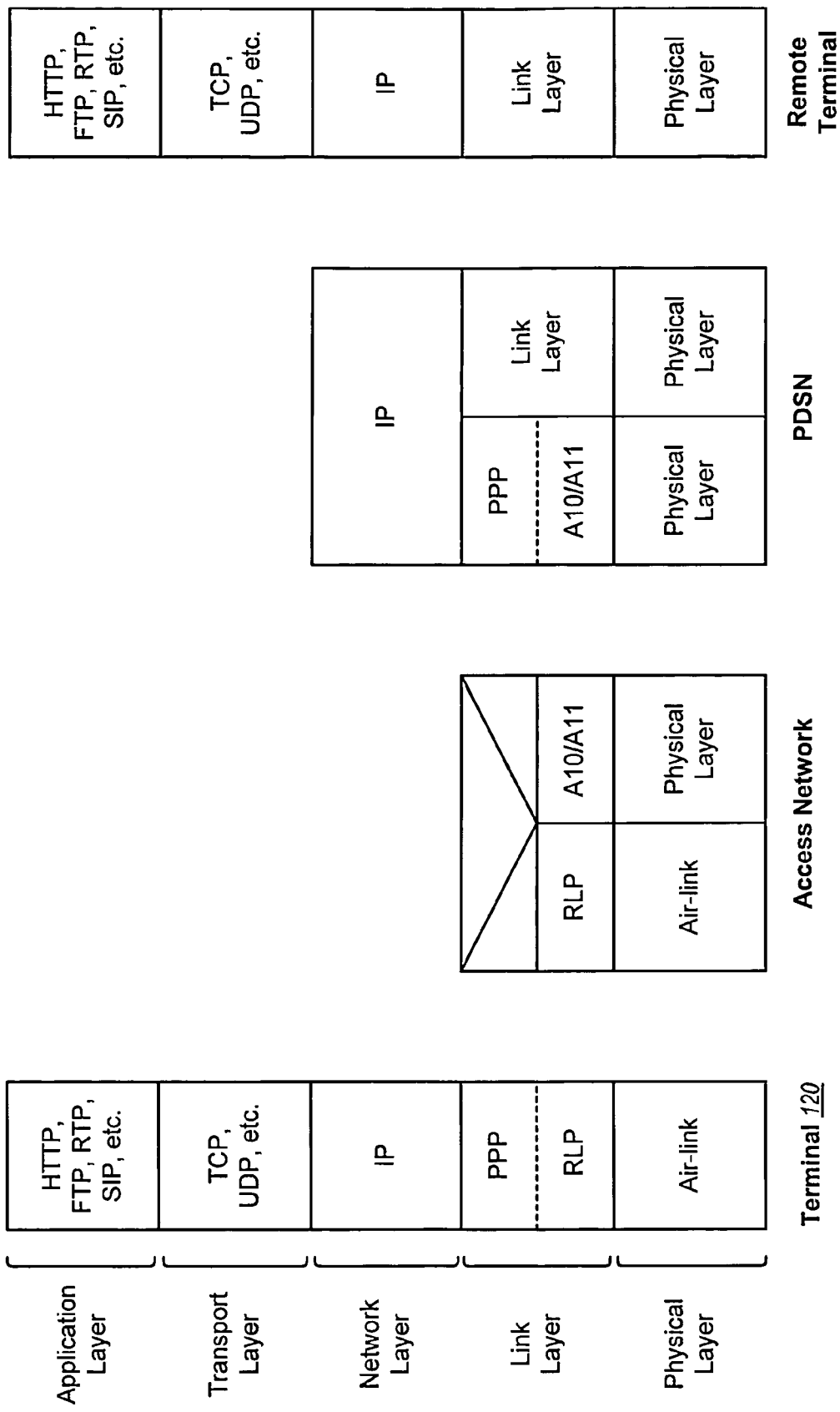
FIG. 4 shows protocol stacks at various entities in FIG. 1.

FIG. 4 shows example protocol stacks at various entities in FIG. 1 for communication between terminal 120 and a remote terminal. The protocol stack for each entity may include an application layer, a transport layer, a network layer, a link layer, and a physical layer.

Terminal 120 may communicate with the remote terminal using HyperText Transfer Protocol (HTTP), File Transfer Protocol (FTP), Real-time Transport Protocol (RTP), Session Initiation Protocol (SIP), and/or other protocols at the application layer. Application layer data may be sent using Transmission Control Protocol (TCP), User Datagram Protocol (UDP), and/or other protocols at the transport layer. Transport layer data (e.g., for TCP and/or UDP) may be encapsulated in Internet Protocol (IP) packets, which are exchanged between terminal 120 and the remote terminal via the access network, the PDSN, and possibly other entities.

The link layer between terminal 120 and the access network is typically dependent on the radio technology used by the access network. For HRPD, the link layer is implemented with Point-to-Point Protocol (PPP) over Radio Link Protocol (RLP). Terminal 120 maintains a PPP session with the PDSN for a data session and communicates with the access network via RLP for data exchanges. RLP operates on top of an air-link interface, e.g., IS-856 for HRPD. The access network communicates with the PDSN via a technology-dependent interface (e.g., A10 and A11 interfaces) that operates on top of a physical layer. The PDSN may communicate with the remote terminal via IP over a link layer and a physical layer.

A Session Configuration Protocol (SCP) is one of the protocols used by a session layer to manage a logical session used when a terminal and the access network communicate. The SCP may negotiate the protocols that are actually used during the session. In addition to the operational instance normally negotiated using the SCP, the SCP may also be used to configure additional sets of session configurations, which may be referred to as "personalities". For example, one of the personalities included in the session may be associated with default physical layer subtype and default Medium Access Control (MAC) subtypes, while another personality may be associated with non-default physical layer and MAC subtypes. The terminal and access network may negotiate multiple personalities. Each personality may be identified by an index and may include different subtypes for the same protocol.

Missing packets may be generated at a receiver when changing RLP instance, e.g., due to handover from one network entity to another. A low impact way of addressing this problem is described below. In particular, one design addresses missing packets that may occur during handover from a source/old Rev A BTS to a target/new Rev 0 BTS. The following describes a personality switch and handover between the Rev A and Rev 0 physical layers in HRPD. When switching between the Rev A and Rev 0 physical layers, different protocols are used.

A personality change may be performed by the access network by sending the following three messages, e.g., in a single physical layer packet:

1. AttributeUpdateRequest message that contains a SessionConfigurationToken—this message instructs the terminal to change its personality after an existing connection is closed.
2. ConnectionClose (CC) message to close the existing connection.
3. TrafficChannelAssignment (TCA) message that instructs the terminal to move to a new channel (that is served by Rev 0 in the case of a Rev A to Rev 0 handover). The new channel under Rev 0 may have a different carrier frequency than the old channel under Rev A.

RLP is a protocol that is used to deliver and receive user data. RLP provides a best effort delivery and attempts to deliver a packet up to a point, then gives up. Error-control mechanisms at higher layers are relied upon to guarantee delivery of user data. RLP uses negative acknowledgement (NAK) and retransmission mechanisms to accomplish the best effort delivery. In addition, RLP uses control frames, retransmitted data frames, and new data frames. The terminal resets RLP when a connection is opened.

High-level Data Link Control (HDLC) is a transmission protocol used at the link layer (layer 2) in which a data frame is embedded with information that allows devices to control data flow and correct errors.

Figure 5:
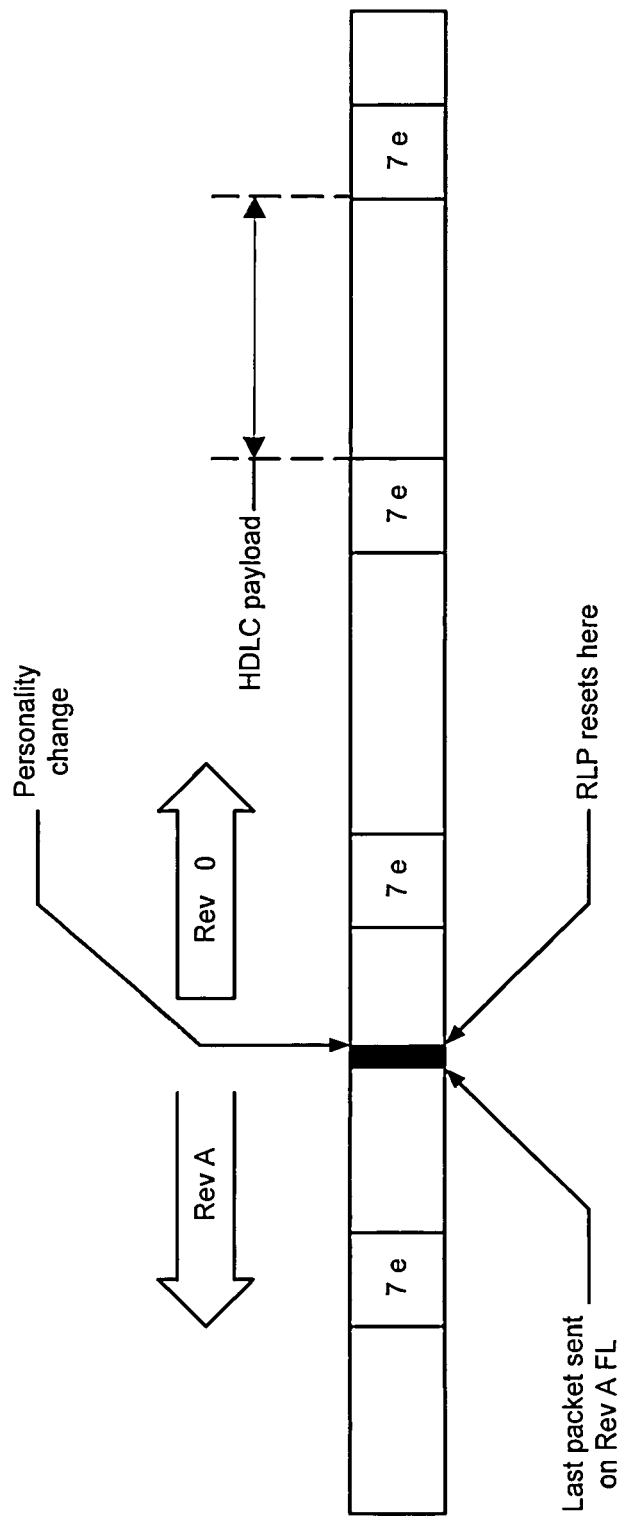
FIG. 5 shows transmission of a packet with a change in personality.

FIG. 5 shows transmission of a forward link packet with a change in personality. FIG. 5 shows HDLC octets in the forward link packet and how they are sent to the terminal during a personality change from Rev A to Rev 0. When the personality change occurs, the connection and RLP are reset. During this resetting, the forward link packet may still be in the progress of being decoded by the terminal. If the terminal switches to a new carrier frequency of Rev 0 before decoding is completed, then the terminal may miss the packet.

Target Rev 0 BTS may start serving the next packet (i.e., the one after the missed/erased packet). In a normal handover where RLP is not reset, the terminal may send a NAK, and the missing packet may be recovered by RLP re-transmission. However, in the scenario described above with the personality change, where the carrier frequency is changed and the connection and hence RLP is reset, the terminal does not send a NAK. Even if the target Rev 0 BTS starts serving the terminal from a few octets prior to the last packet that the old Rev A BTS has served, since RLP is reset, the terminal may not perform duplicate detection and the resulting HDLC packets may be corrupted. This may be shown by the darkened section in FIG. 5. As a result, a hole in an HDLC re-assembly buffer may likely occur after a personality change, and this hole may not be recoverable.

Figure 6A:
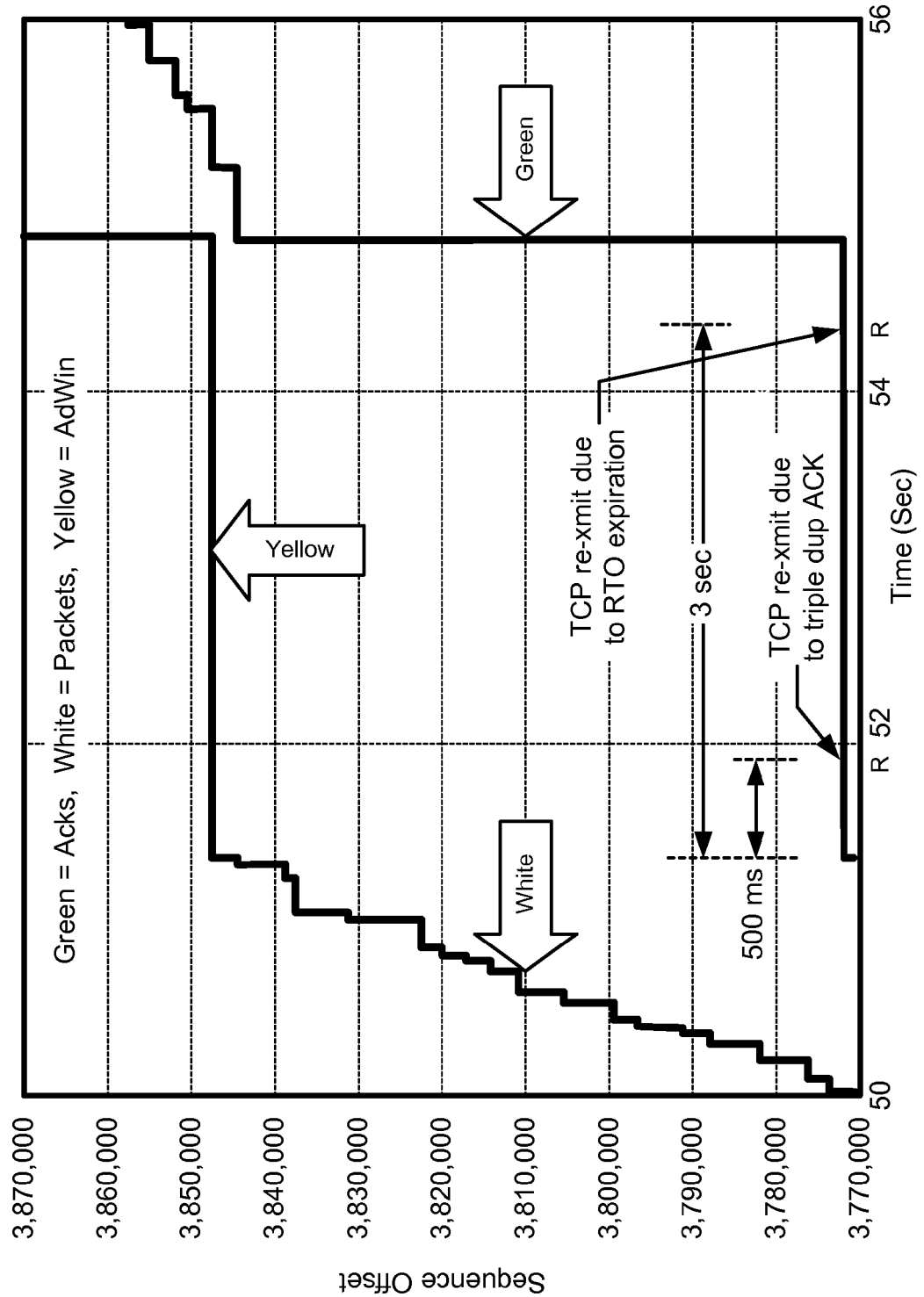
FIGS. 6A and 6B show TCP traces of events.

FIG. 6A shows a TCP trace of such event. The first retransmitted packet (which is denoted by the first 'R' when reading the graph from left to right) occurred after a TCP sender (on the access network side) receives triple DupACK. This retransmitted packet gets clogged behind a TCP window worth of packets (in this example 64 kilobytes (KB) of data) and it may take a while for the terminal to receive the packet. In the meantime, a TCP retransmission timeout (RTO) timer expires, which is shown by the second 'R' in FIG. 6A. In this example, it takes approximately 3 seconds for the RTO timer to expire and no new data was send by the TCP sender in this time interval. Also, as a result of RTO expiration, the TCP window may be shrunk to one segment and a slow start may be triggered.

Figure 6B:
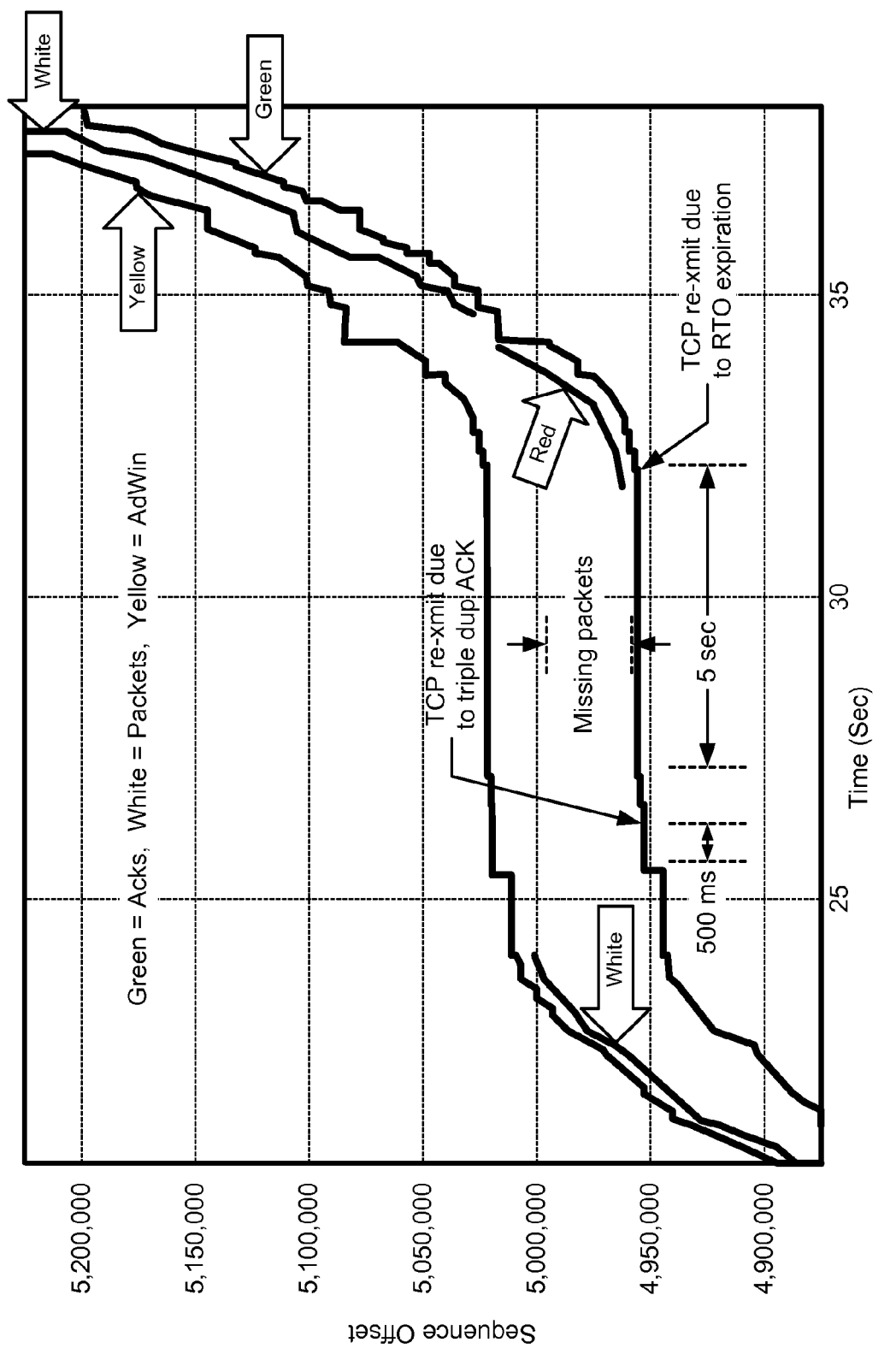

FIG. 6B shows an example TCP trace associated with a Rev A to Rev 0 handover. In this TCP trace, there is no sign of the terminal ever receiving a block of packets marked as "Missing packets". If those packets were actually received by the terminal, then the TCP sender should have received duplicate ACKs, which would have shown up in FIG. 6B as green tick marks (similar to those shown in FIG. 6A). This may be due to the data not being transferred from the source Rev A BTS to the target Rev 0 BTS.

TCP is one of the main protocols in the TCP/IP suite of network protocols. Whereas IP deals only with packets, TCP enables two hosts to establish and exchange streams of data over a connection. In addition, TCP guarantees delivery of data and also guarantees that packets will be delivered to a host in the same order in which they were sent. TCP ensures data delivery by using a retransmission timer in the absence of any feedback from a receiver. The timer's duration is referred to as a retransmission timeout (RTO). In HRPD, new data from the PDSN may arrive as a result of the TCP RTO timer expiration, which can take a few seconds depending on the value of the RTO timer (e.g., 5 seconds as shown in FIG. 6B).

Figure 7:
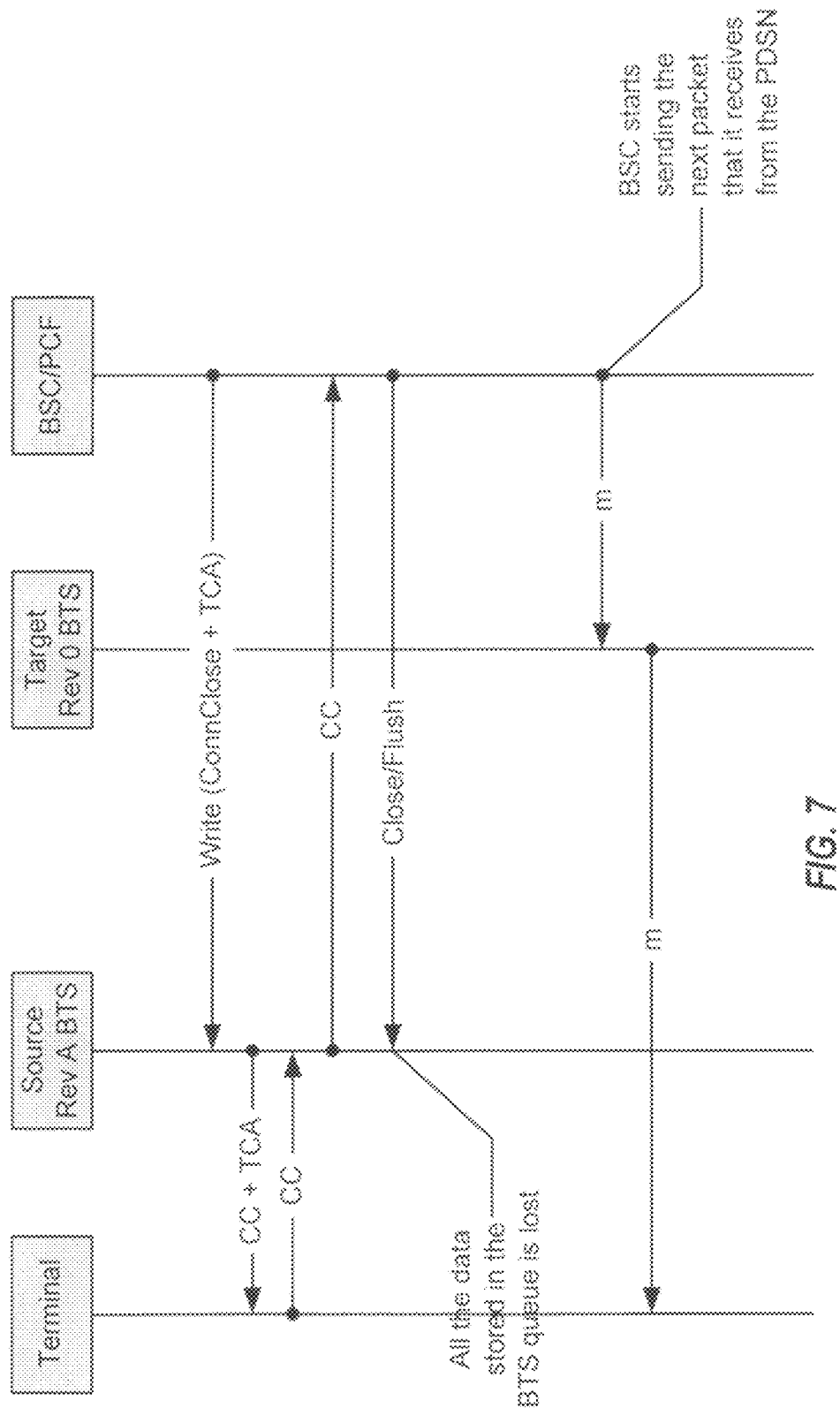
FIG. 7 shows a call flow for handover.

FIG. 7 shows a call flow that illustrates a sequence of events discussed above. After receiving the ConnectionClose (CC) message from the terminal, the BSC/PCF de-allocates resources from the source Rev A BTS. This causes the data that is still in the source Rev A BTS, but not sent to the terminal, to be purged, as indicated by the caption "All the data stored in the BTS queue is lost".

As a result, the BSC/PCF may send only TCP_window Max_rev_A_BTS_Queue_Depth bytes to the target Rev 0 BTS after the handover from Rev A to Rev 0. The maximum amount of data a BTS has to send is represented by the maximum amount of data its queue can hold, which is Max_Rev_A_BTS_Queue_Depth.

A TCP window is an amount of outstanding data (unacknowledged by a receiver) that a sender can send on a particular connection. For example, if a connection has a TCP window size of 128 KB, then the sender can only send 128 KB of data. The sender then stops and waits for an acknowledgment from the receiver that some or all of the data has been received. If the receiver sends an acknowledgement that all the data has been received, then the sender can send another 128 KB. If the receiver sends an acknowledgement that only part of the data has been received (e.g., only 32K out of the 128K), then the sender may send some more data (e.g., another 32K).

TCP_window—Max_rev_A_BTS_Queue_Depth is the difference between (i) the TCP window used to track outstanding data which is to be transmitted to the terminal and (ii) the maximum size of the BTS's queue which, as noted above, may be purged by the source Rev A BTS when the BSC/PCF de-allocated resources from the source Rev A BTS upon receiving the ConnectionClose message from the terminal. Thus, because a NAK was not sent when Max_rev_A_BTS_Queue_Depth of data was purged, its content is subtracted from the total amount of data to be transmitted in the TCP window by the target Rev 0 BTS to the terminal.

Figure 8:
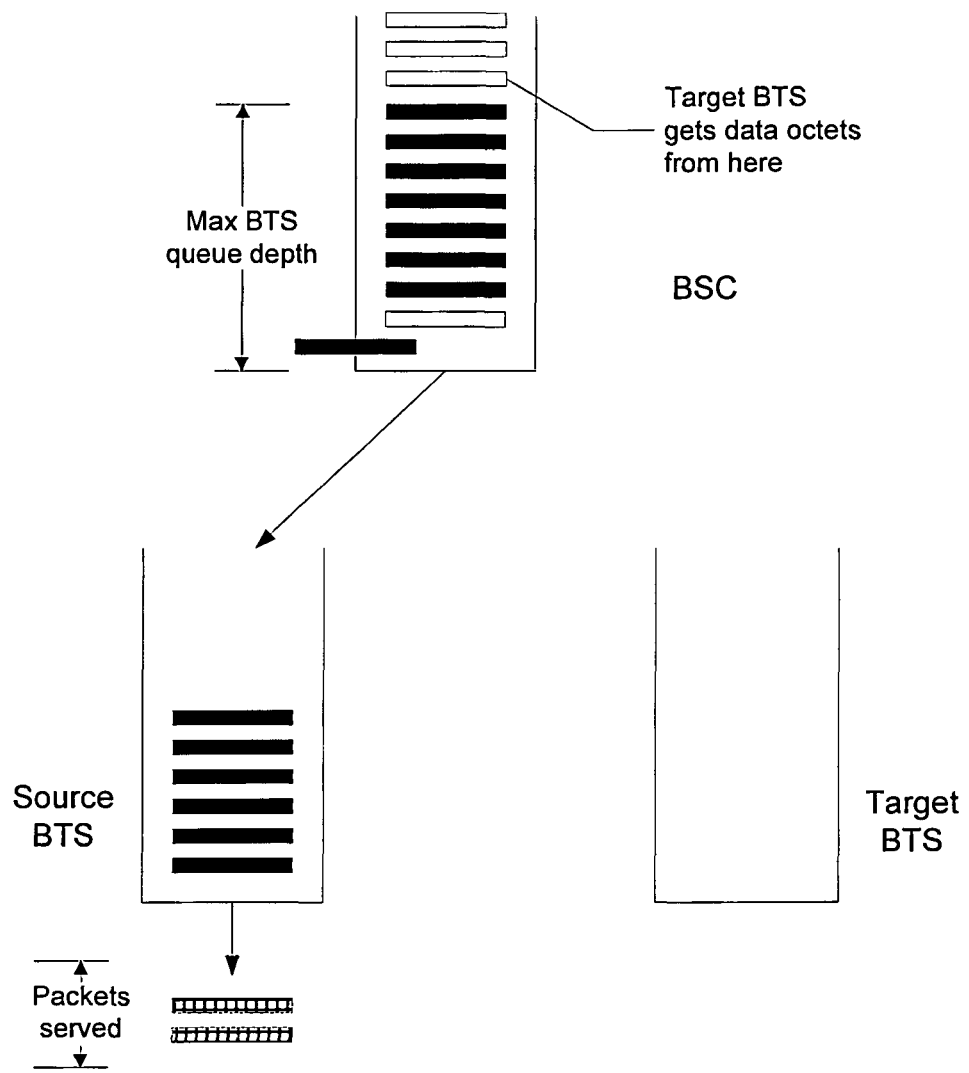
FIG. 8 shows the queues at the BSC/PCF and the source and target BTSs.

FIG. 8 shows the queues at the BSC/PCF, the target/new Rev 0 BTS, and the source/old Rev A BTS during the Rev A to Rev 0 handover. The BSC/PCF sends Max BTS queue depth of data to the source Rev A BTS prior to the handover and sends subsequent data to the target Rev 0 BTS. The Max BTS queue depth of data in the source Rev A BTS may be purged before being sent by the source Rev A BTS. In this scenario, the target Rev 0 BTS does not receive the last data sent to the source Rev A BTS by the BSC/PCF because the Max BTS queue depth of data still in the source Rev A BTS was (i) purged before being sent by the source Rev A BTS and (i) not NAKed by the terminal because of the switching of personalities. The BSC/PCF may wait for the TCP RTO timer to expire before sending any new data to the target Rev 0 BTS.

Figure 9:
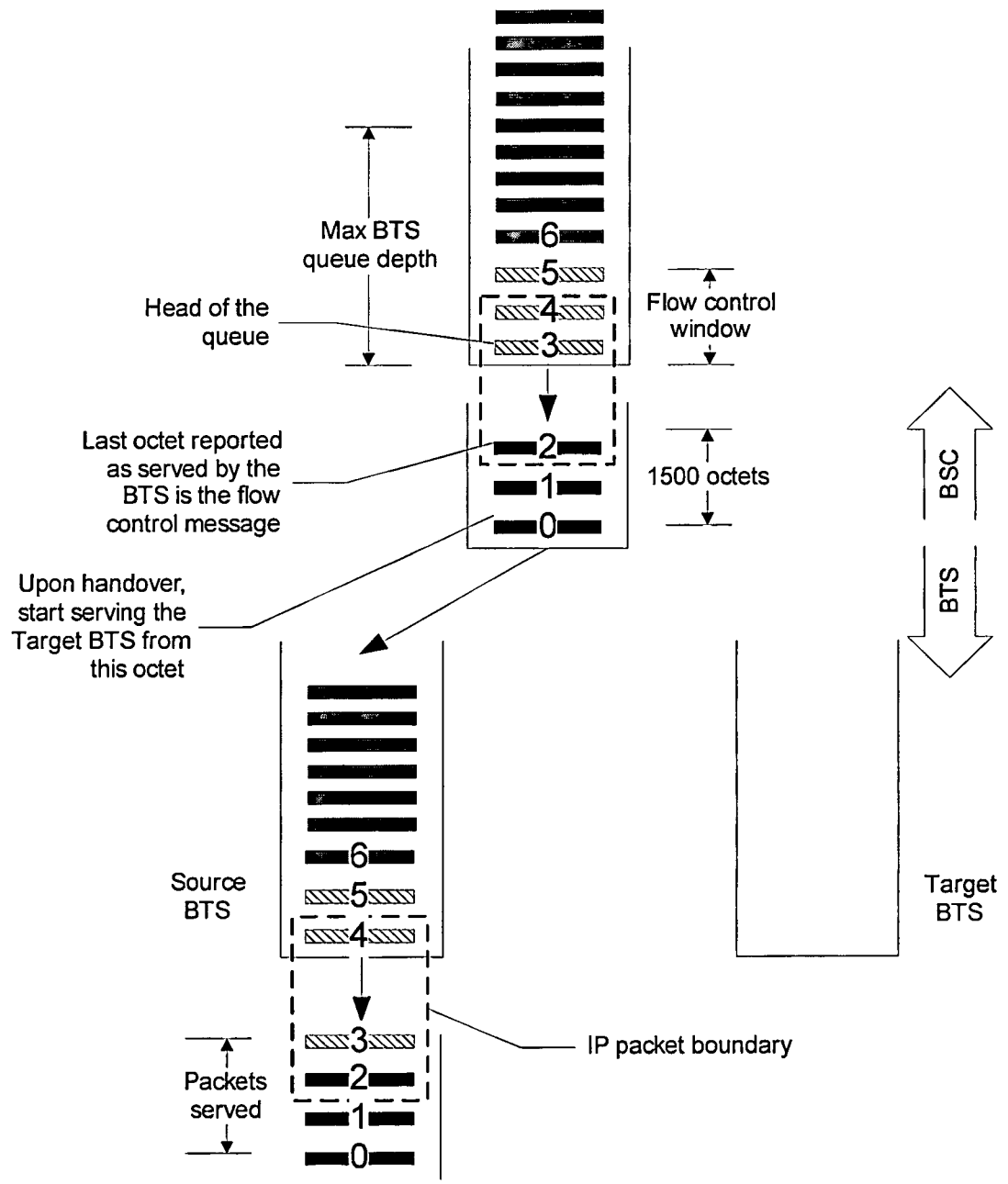
FIG. 9 shows a design for sending duplicate data during handover.

FIG. 9 shows a design for combating data purged by the source Rev A BTS during Rev A to Rev 0 handover. In this design, the BSC/PCF stores a buffer of data that is reported by the BTS in a flow control message as served (i.e., no NAK was sent). The buffer of data may be of any suitable size and may store N octets of data. In one design, the buffer stores enough data for a maximum transmission unit (MTU), which is the largest packet that a network protocol may submit. This MTU may be N=1500 octets of data, which is labeled as packets 0, 1, 2 in FIG. 9. When the handover occurs, the BSC/PCF starts serving the target Rev 0 BTS from the first octet of this N-octet buffer. This ensures that any octets of data sent to the source Rev A BTS and then purged without being NAKed, will be forwarded to the target Rev 0 BTS to be sent to the terminal before sending any new data.

The design in FIG. 9 may not prevent a packet from being damaged upon handover. However, the design ensures that the damaged packet is retransmitted to the terminal from the beginning by retransmitting N octets of data before sending any new data.

Figure 10:
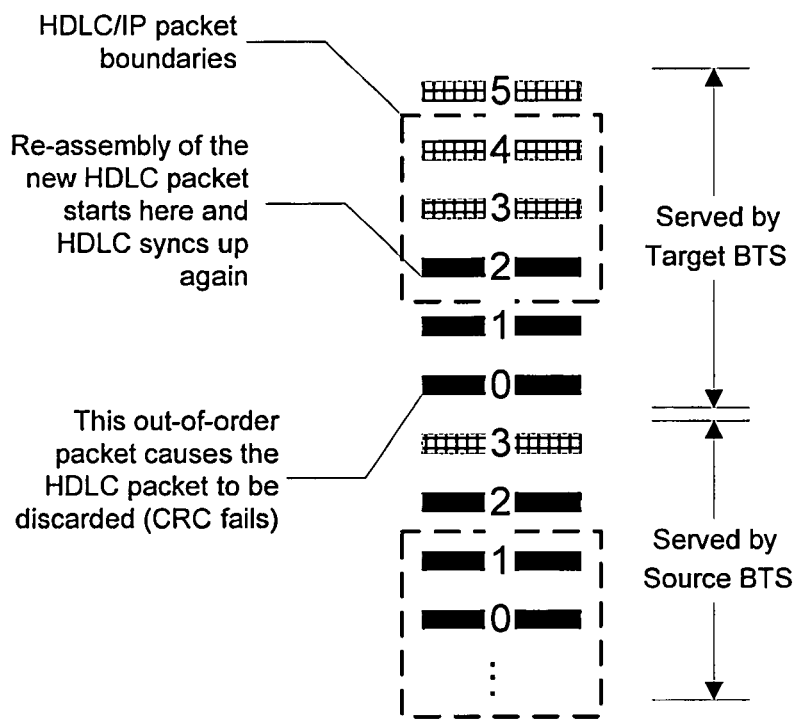
FIG. 10 shows an re-assembly buffer at the terminal.

FIG. 10 shows a design of an HDLC re-assembly buffer at the terminal for the design shown in FIG. 9. In this example, the terminal receives packets 0, 1, 2 and 3 from the source BTS, and then receives packets 0, 1, 2, 3, 4, 5, etc., from the target BTS. As shown in FIG. 10, an IP packet composed of packets 2, 3, and 4 may be received by the terminal from the target BTS even though the initial reception of this IP packet is interrupted by the redundant reception of packets 0 and 1. This design thus avoids loss of data due to handover with a personality change.

This design also avoid RTO expiration during the handover. Upon handover to the new BTS, the BSC/PCF does not purge all data that has been sent to the source BTS. Therefore, after the handover, the target BTS has data to send to the terminal, and no RTO expiration would occur.

This design may be implemented with little or no software changes to the BTS and with little or no changes to any of the BTS-BSC call flows. The changes, if any, may be concentrated at the BSC/PCF. In a worst-case scenario, N+"flow control window" octets of spurious data may be sent to the terminal. If N=1500 octets and a flow control window covers 4 KB, then it may take approximately 88 ms to send 1500+4K bytes of spurious data at 500 kbps. Therefore, the cost associated with sending the spurious data may be negligible and may be justified given the gain that the design provides (i.e., avoiding several seconds of not receiving any data and RTO expiration and closing down the TCP window).

Figure 11:
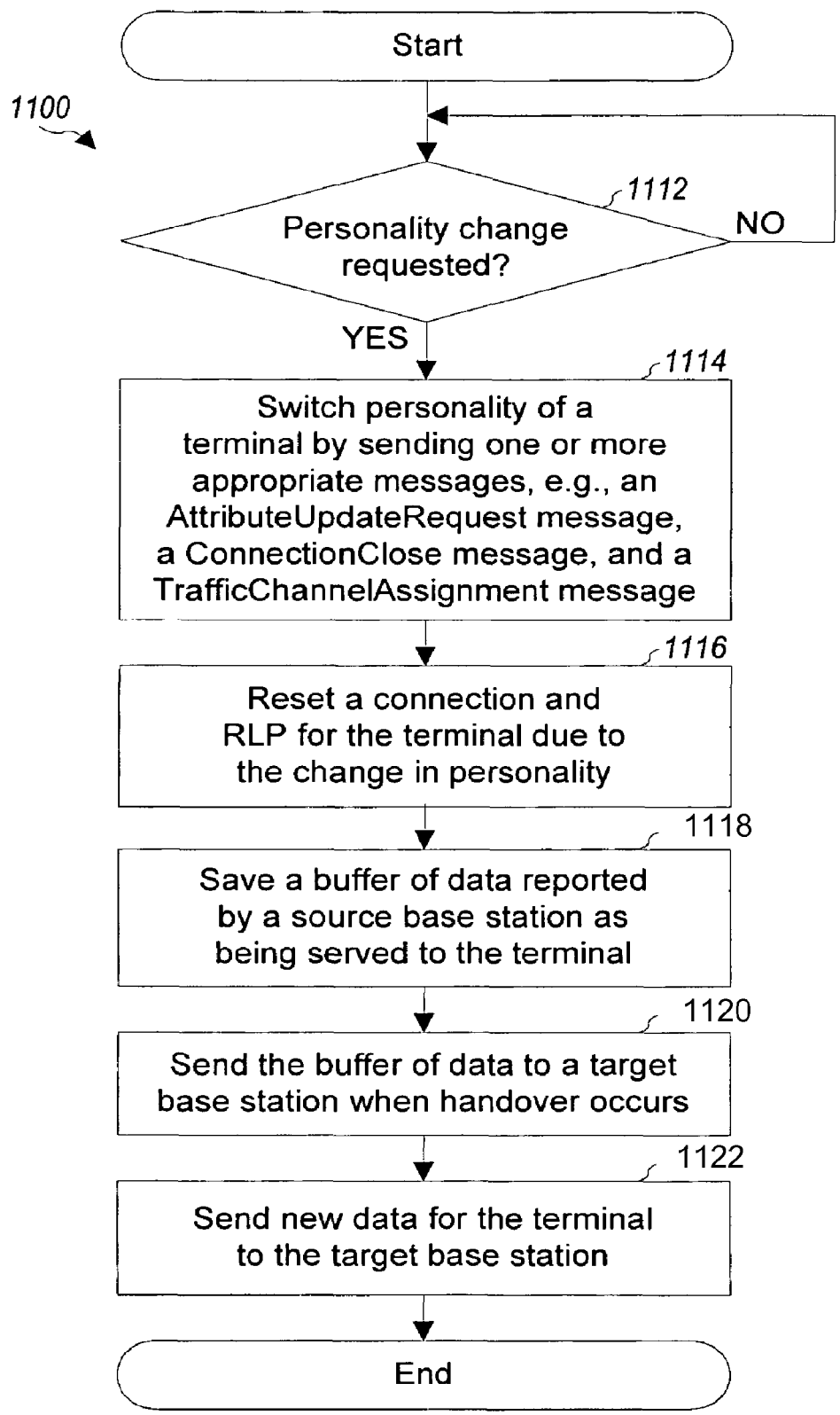
FIG. 11 shows a process performed by a network entity to support handover.

FIG. 11 shows a design of a process 1100 performed by a network entity (e.g., a BSC/PCF) to support handover of a terminal from a source base station to a target base station. A determination is made whether a change in personality is requested by the terminal (block 1112). If the answer is 'Yes', then the personality of the terminal may be switched by sending one or more appropriate messages, e.g., an AttributeUpdateRequest message, a ConnectionClose message, and a TrafficChannelAssignment message (block 1114). The connection and RLP for the terminal may be reset due to the change in personality (block 1116). A buffer of data reported by the source base station as being served to the terminal (e.g., no NAK was sent) may be saved by the BSC/PCF (block 1118). The buffer of data may be sent to the target base station when handover occurs (block 1120). New data may thereafter be sent to the target base station (block 1122). This buffer of duplicate data may avoid both loss of data and retransmission timeout by TCP during the handover.

Figure 12:
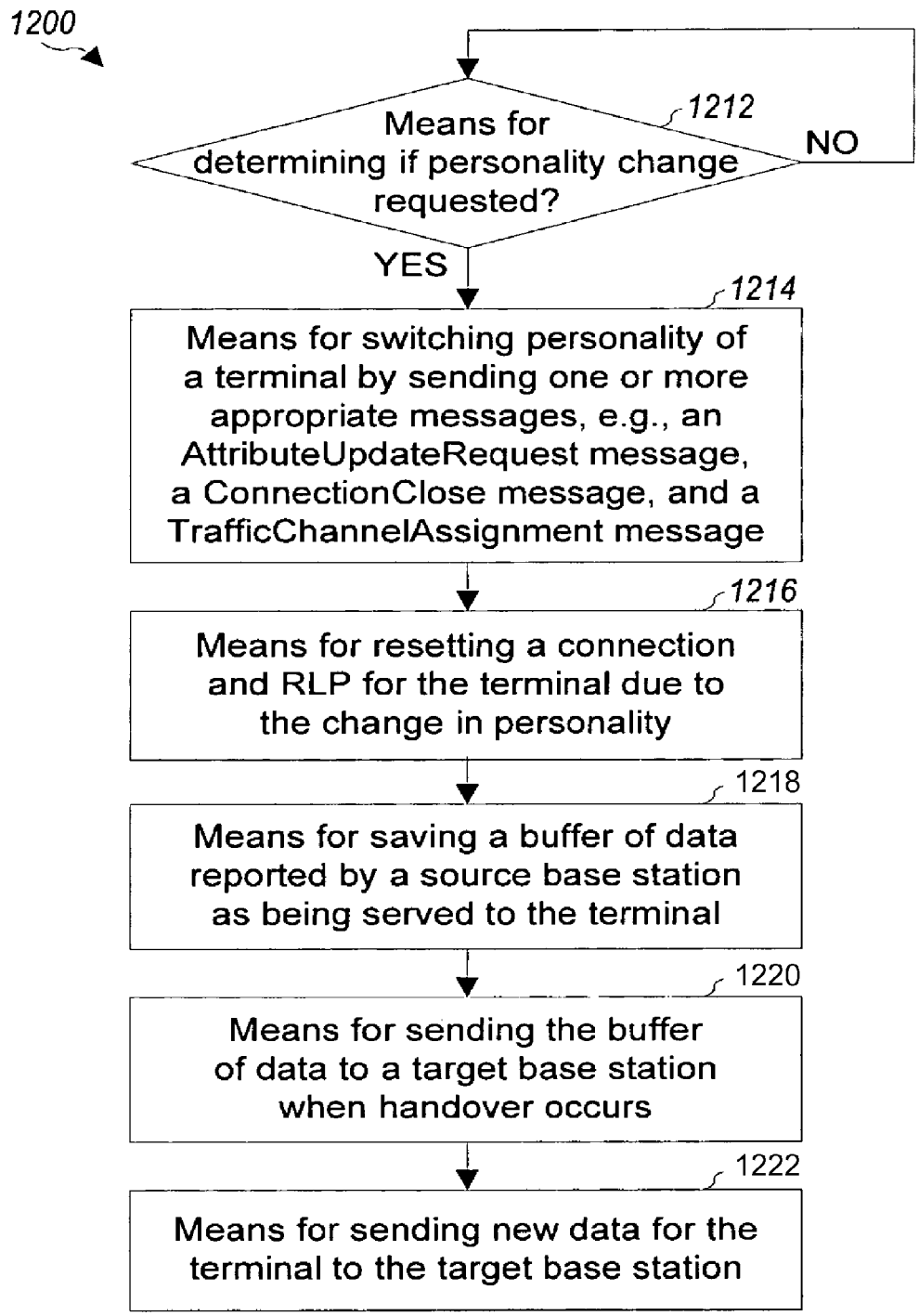
FIG. 12 shows an apparatus for supporting handover.

FIG. 12 shows a design of an apparatus 1200 for supporting handover of a terminal from a source base station to a target base station. Apparatus 1200 includes means for determining whether a change in personality is requested by the terminal (module 1212), means for switching personality of the terminal by sending one or more appropriate messages, e.g., an AttributeUpdateRequest message, a ConnectionClose message, and a TrafficChannelAssignment message (module 1214), means for resetting the connection and RLP due to the change in personality (module 1216), means for saving a buffer of data reported by the source base station as being served to the terminal (module 1218), means for sending the buffer of data to the target base station when handover occurs (module 1220), and means for sending new data to the target base station (module 1222).

Figures 13, 14:
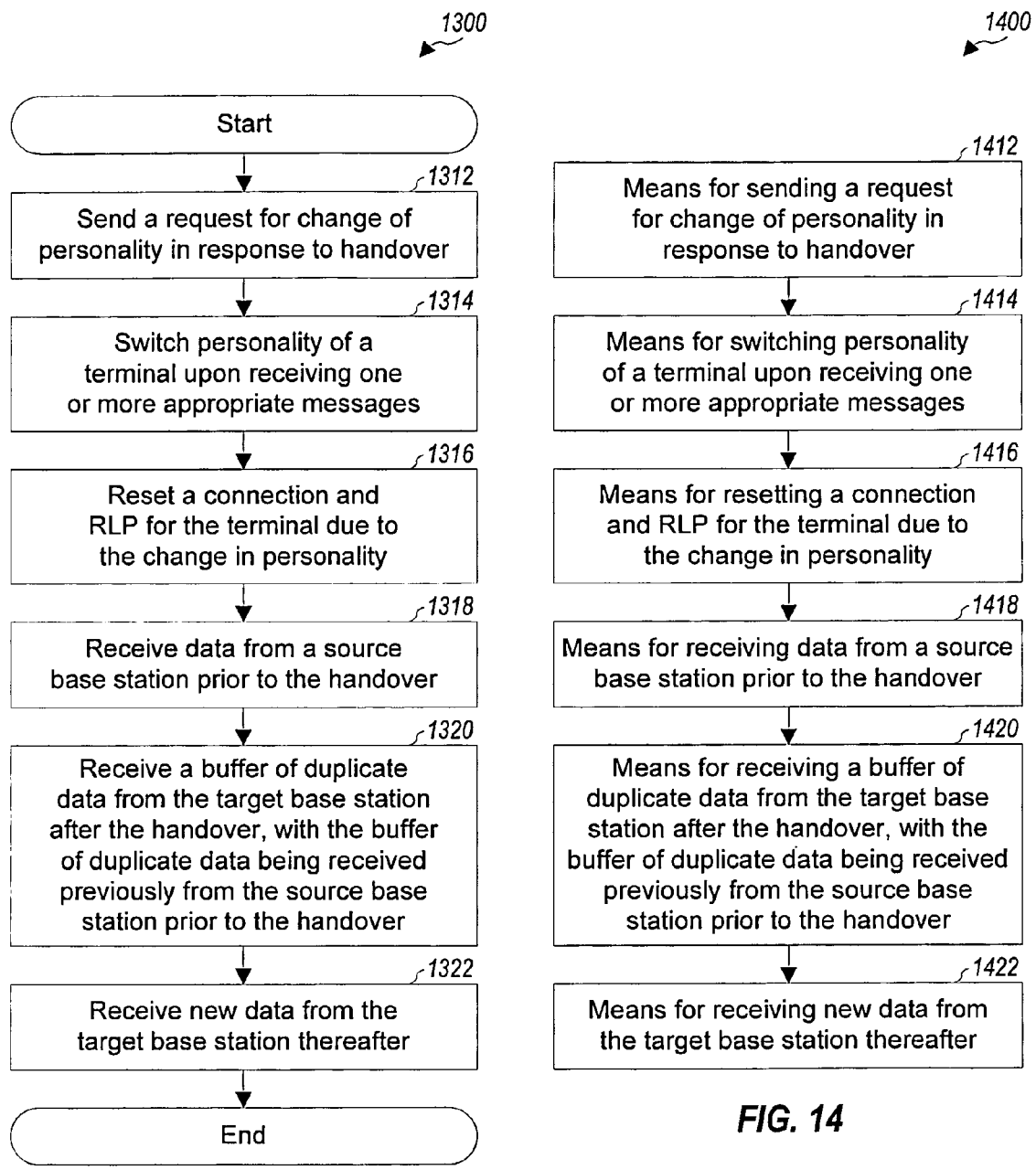
FIG. 13 shows a process performed by a terminal for handover.
FIG. 14 shows an apparatus for performing handover.

FIG. 13 shows a design of a process 1300 performed by a terminal for handover from a source base station to a target base station. A request for change of personality in response to the handover may be sent (block 1312). Personality of the terminal may be switched upon receiving one or more appropriate messages, e.g., an AttributeUpdateRequest message, a ConnectionClose message, and a TrafficChannelAssignment message (block 1314). The connection and RLP for the terminal may be reset due to the change in personality (block 1316). Data may be received from the source base station prior to the handover (block 1318). A buffer of duplicate data received from the source base station prior to the handover may be received again from the target base station after the handover (block 1320). New data may thereafter be received from the target base station (block 1322).

FIG. 14 shows a design of an apparatus 1400 for performing handover from a source base station to a target base station. Apparatus 1400 includes means for sending a request for change of personality for the handover (module 1412), means for switching personality of the terminal upon receiving one or more appropriate messages (module 1414), means for resetting the connection and RLP for the terminal due to the change in personality (module 1416), means for receiving data from the source base station prior to the handover (module 1418), means for receiving a buffer of duplicate data from the target base station after the handover, with the buffer of data being received previously from the source base station prior to the handover (module 1420), and means for receiving new data from the target base station thereafter (module 1422).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
a memory coupled to at least one processor; and
the at least one processor configured:
to reset a connection for a terminal in response to handover from a source base station to a target base station,
to identify a duplicate of a first data from the source base station, the first data reported as having been served to the terminal by the source base station prior to the reset but not acknowledged as being received by the terminal, the unacknowledged first data being subject to a purge as a result of the reset,
to store the duplicate of the first data identified from the source base station,
after the storing, to send the duplicate of the first data to the target base station after the handover, and
to send new data for the terminal to the target base station after sending the duplicate of the first data.

2. The apparatus of claim 1, wherein the at least one processor is configured to determine when a session configuration change for the terminal is requested, and to switch the session configuration of the terminal when requested.

3. The apparatus of claim 2, wherein the at least one processor is configured to switch the session configuration of the terminal in response to the handover from the source base station to the target base station.

4. The apparatus of claim 2, wherein the at least one processor is configured to reset Radio Link Protocol (RLP) for the terminal in response to the switch in the session configuration of the terminal.

5. The apparatus of claim 1, wherein the source base station supports a first revision of an air interface and the target base station supports a second revision of the air interface.

6. The apparatus of claim 1, wherein the at least one processor is configured to send the first data to the source base station prior to the handover.

7. The apparatus of claim 1, wherein the at least one processor is configured to store a predetermined amount of data most recently served to the terminal by the source base station.

8. The apparatus of claim 7, wherein the at least one processor is configured to determine the data most recently served to the terminal by the source base station based on a flow control message received from the source base station.

9. The apparatus of claim 1, wherein the at least one processor is configured to store an amount of data corresponding to a maximum packet size.

10. The apparatus of claim 1, wherein the at least one processor is configured to send the stored duplicate of the first data to the target base station after the handover to avoid retransmission timeout (RTO) of Transmission Control Protocol (TCP).

11. A method for wireless communication, comprising:
resetting a connection for a terminal in response to handover from a source base station to a target base station;
identifying a duplicate of a first data from the source base station, the first data reported as having been served to the terminal by the source base station prior to the resetting but not acknowledged as being received by the terminal, the unacknowledged first data being subject to a purge as a result of the reset;
storing the duplicate of the first data identified from the source base station;
after storing, sending the duplicate of the first data to the target base station after the handover; and
sending new data for the terminal to the target base station after sending the duplicate of the first data.

12. The method of claim 11, further comprising:
determining when a session configuration change for the terminal is requested; and
switching the session configuration of the terminal when requested.

13. The method of claim 11, further comprising:
resetting Radio Link Protocol (RLP) for the terminal in response to the switch in the session configuration of the terminal.

14. The method of claim 11, wherein storing the duplicate of the first data comprises storing a predetermined amount of data most recently served to the terminal by the serving base station.

15. The method of claim 11, wherein the sending the stored duplicate of the first data comprises sending the stored duplicate of the first data to the target base station after the handover to avoid retransmission timeout (RTO) of Transmission Control Protocol (TCP).

16. An apparatus for wireless communication, comprising:
means for resetting a connection for a terminal in response to handover from a source base station to a target base station;
means for identifying a duplicate of a first data from the source base station, the first data reported as having been served to the terminal by the source base station prior to resetting the connection but not acknowledged as being received by the terminal, the unacknowledged first data being subject to a purge as a result of the reset;
means for storing the duplicate of the first data identified from the source base station;
means for sending the duplicate of the first data, after storing the duplicate of the first data, to the target base station after the handover; and
means for sending new data for the terminal to the target base station after sending the duplicate of the first data.

17. The apparatus of claim 16, further comprising:
means for determining when a session configuration change for the terminal is requested; and
means for switching the session configuration of the terminal when requested.

18. The apparatus of claim 16, further comprising:
means for resetting Radio Link Protocol (RLP) for the terminal in response to the switch in the session configuration of the terminal.

19. The apparatus of claim 16, wherein the means for storing the duplicate of the first data comprises means for storing a predetermined amount of data most recently served to the terminal by the serving base station.

20. The apparatus of claim 16, wherein the means for sending the duplicate of the first data comprises means for sending the duplicate of the first data to the target base station after the handover to avoid retransmission timeout (RTO) of Transmission Control Protocol (TCP).

21. A computer program product, comprising:
a non-transitory computer-readable medium comprising:
code for causing at least one computer to reset a connection for a terminal in response to handover from a source base station to a target base station;
code for causing at least one computer to identify a duplicate of a first data from the source base station, the first data reported as having been served to the terminal by the source base station prior to the reset but not acknowledged as being received by the terminal, the unacknowledged first data being subject to a purge as a result of the reset;
code for causing the at least one computer to store the duplicate of the first data identified from the source base station;
code for causing the at least one computer to send the duplicate of the first data, after storing the duplicate of the first data, to the target base station after the handover; and
code for causing the at least one computer to send new data for the terminal to the target base station after sending the duplicate of the first data.

22. An apparatus for wireless communication, comprising:
a memory; and
at least one processor coupled to the memory and configured:
to reset a connection for a terminal in response to handover from a source base station to a target base station,
to identify a duplicate of a first data from the source base station prior to the handover, in which the first data is reported as having been served to the terminal by the source base station prior to the reset but not acknowledged as being received by the terminal, the unacknowledged first data being subject to a purge as a result of the reset,
to receive the duplicate of the first data that is stored prior to handover from the target base station after the handover, and to receive new data from the target base station after receiving the duplicate data.

23. The apparatus of claim 22, wherein the at least one processor is configured to switch a session configuration of the terminal in response to the handover.

24. The apparatus of claim 22, wherein the at least one processor is configured to discard the duplicate data received from the target base station, and to reassemble packets based on the new data received from the target base station and prior data received from the source base station.

25. A method for wireless communication, comprising:
resetting a connection for a terminal in response to handover from a source base station to a target base station;
identifying a duplicate of a first data from the source base station prior to the handover, in which the first data is reported as having been served to the terminal by the source base station prior to the reset but not acknowledged as being received by the terminal, the unacknowledged first data being subject to a purge as a result of the reset;

receiving the duplicate of the first data that is stored prior to handover from the target base station after the handover; and receiving new data from the target base station after receiving the duplicate data.

26. The method of claim 25, further comprising: switching a session configuration of the terminal in response to the handover.

27. The method of claim 25, further comprising:
discarding the duplicate data received from the target base station; and
reassembling packets based on the new data received from the target base station and prior data received from the source base station.

28. An apparatus for wireless communication, comprising:
means for resetting a connection for a terminal in response to handover from a source base station to a target base station;
means for identifying a duplicate of a first data from the source base station prior to the handover, in which the first data is reported as having been served to the terminal by the source base station prior to resetting the connection but not acknowledged as being received by the terminal, the unacknowledged first data being subject to a purge as a result of the reset;
means for receiving the duplicate of the first data that is stored prior to handover from the target base station after the handover; and
means for receiving new data from the target base station after receiving the duplicate data.

29. The apparatus of claim 28, further comprising:
means for switching a session configuration of the terminal in response to the handover.

30. The apparatus of claim 28, further comprising:
means for discarding the duplicate data received from the target base station; and
means for reassembling packets based on the new data received from the target base station and prior data received from the source base station.

31. A computer program product, comprising:
a non-transitory computer-readable medium comprising:
code for causing at least one computer to reset a connection for a terminal in response to handover from a source base station to a target base station;
code for causing the at least one computer to identify a duplicate of a first data from the source base station prior to the handover, in which the first data is reported as having been served to the terminal by the source base station prior to the reset but not acknowledged as being received by the terminal, the unacknowledged first data being subject to a purge as a result of the reset;
code for causing the at least one computer to receive a duplicate of the first data that is stored prior to handover from the target base station after the handover; and
code for causing the at least one computer to receive new data from the target base station after receiving the duplicate data.

* * * * *